(12) United States Patent
Serkland et al.

(10) Patent No.: US 9,428,273 B1
(45) Date of Patent: Aug. 30, 2016

(54) HELICOPTER CREW-SERVED WEAPON MOUNTING APPARATUS

(71) Applicant: Contract Fabrication and Design LLC, Princeton, TX (US)

(72) Inventors: Mark D. Serkland, Lavon, TX (US); James A. Hardin, McKinney, TX (US); Jesse L. Davison, McKinney, TX (US)

(73) Assignee: Contract Fabrication and Design, LLC, Princeton, TX (US)

( * ) Notice: Subject to any disclaimer, the term of this patent is extended or adjusted under 35 U.S.C. 154(b) by 0 days.

(21) Appl. No.: 14/332,783

(22) Filed: Jul. 16, 2014

Related U.S. Application Data

(60) Provisional application No. 61/856,984, filed on Jul. 22, 2013.

(51) Int. Cl.
| | |
|---|---|
| *B64D 7/00* | (2006.01) |
| *B64D 7/06* | (2006.01) |
| *F41A 27/06* | (2006.01) |
| *F41A 9/29* | (2006.01) |

(52) U.S. Cl.
CPC . *B64D 7/06* (2013.01); *F41A 9/29* (2013.01); *F41A 27/06* (2013.01)

(58) Field of Classification Search
CPC ............ F41A 23/00; B64D 9/00; B64D 7/00
USPC .............. 89/37.16, 37.22, 37.21; 244/118.1, 244/137.4; 224/401
See application file for complete search history.

(56) References Cited

U.S. PATENT DOCUMENTS

| | | | | |
|---|---|---|---|---|
| 4,609,168 A * | 9/1986 | Dean | ..................... | A61G 3/0891 244/118.1 |
| 5,024,138 A | 6/1991 | Sanderson et al. | | |
| 5,072,895 A * | 12/1991 | Camus | ..................... | B64C 27/00 224/401 |
| 5,187,318 A * | 2/1993 | Sanderson | .............. | F41A 23/00 89/1.54 |
| 5,253,574 A * | 10/1993 | Sanderson | .............. | F41A 23/00 89/33.16 |
| 5,417,141 A * | 5/1995 | Sanderson | .............. | F41A 23/52 89/37.16 |
| 5,419,234 A * | 5/1995 | Sanderson | .............. | B64D 7/00 89/33.16 |
| 5,421,239 A * | 6/1995 | Sanderson | .............. | B64D 1/08 89/37.16 |
| 5,517,895 A * | 5/1996 | Sanderson | .............. | B64C 1/18 244/118.1 |
| 5,767,436 A * | 6/1998 | Sanderson | .............. | B64D 7/00 89/37.16 |
| 6,176,167 B1 * | 1/2001 | Sanderson | .............. | B64D 1/06 244/137.4 |
| 6,241,185 B1 | 6/2001 | Sanderson | | |
| 6,250,196 B1 * | 6/2001 | Sanderson | .............. | B64D 7/02 89/37.16 |
| 6,564,690 B1 * | 5/2003 | Long | ....................... | B64D 7/06 224/181 |
| 7,481,147 B1 * | 1/2009 | Serkland | .................. | F41F 3/06 244/118.1 |
| 7,765,912 B1 | 8/2010 | Serkland | | |
| 7,958,813 B1 * | 6/2011 | Serkland | .................. | B64D 7/04 244/118.1 |

* cited by examiner

*Primary Examiner* — Michael David
(74) *Attorney, Agent, or Firm* — Harness Dickey & Pierce PLC; Robert C. Klinger

(57) ABSTRACT

Armament apparatus is provided for an aircraft having an interior area. The armament apparatus includes a horizontally disposed, generally plank-shaped elongated support beam member having top and bottom sides, a longitudinally intermediate section extending transversely through the interior area, and an outer end portion extending outwardly beyond an exterior side of the aircraft and having top and bottom sides and laterally opposite side edges. The outer support beam end portion, along at least a substantial portion of its length is laterally narrower than the intermediate section of the support beam member. This permits a crew member to sit on the support beam member, with his legs outside the aircraft and downwardly straddling the outer support beam end portion, and operate a crew-served weapon on the top side of the outer end portion of support beam member.

8 Claims, 4 Drawing Sheets

HELICOPTER CREW-SERVED WEAPON MOUNTING APPARATUS

CROSS-REFERENCE TO RELATED APPLICATION

The present application claims the benefit of the filing date of provisional U.S. patent application No. 61/856,984 filed Jul. 22, 2013. The entire disclosure of the provisional application is hereby incorporated herein by this reference.

BACKGROUND OF THE INVENTION

The present invention relates generally to support beam-based mounting apparatus for a crew-served weapon, representatively a machine gun. More specifically, the present invention provides aircraft weapon mounting apparatus that incorporates various improvements over the helicopter crew-served weapon mounting apparatus illustrated and described in U.S. Pat. No. 7,765,912 to Serkland.

DETAILED DESCRIPTION

Figure 1:
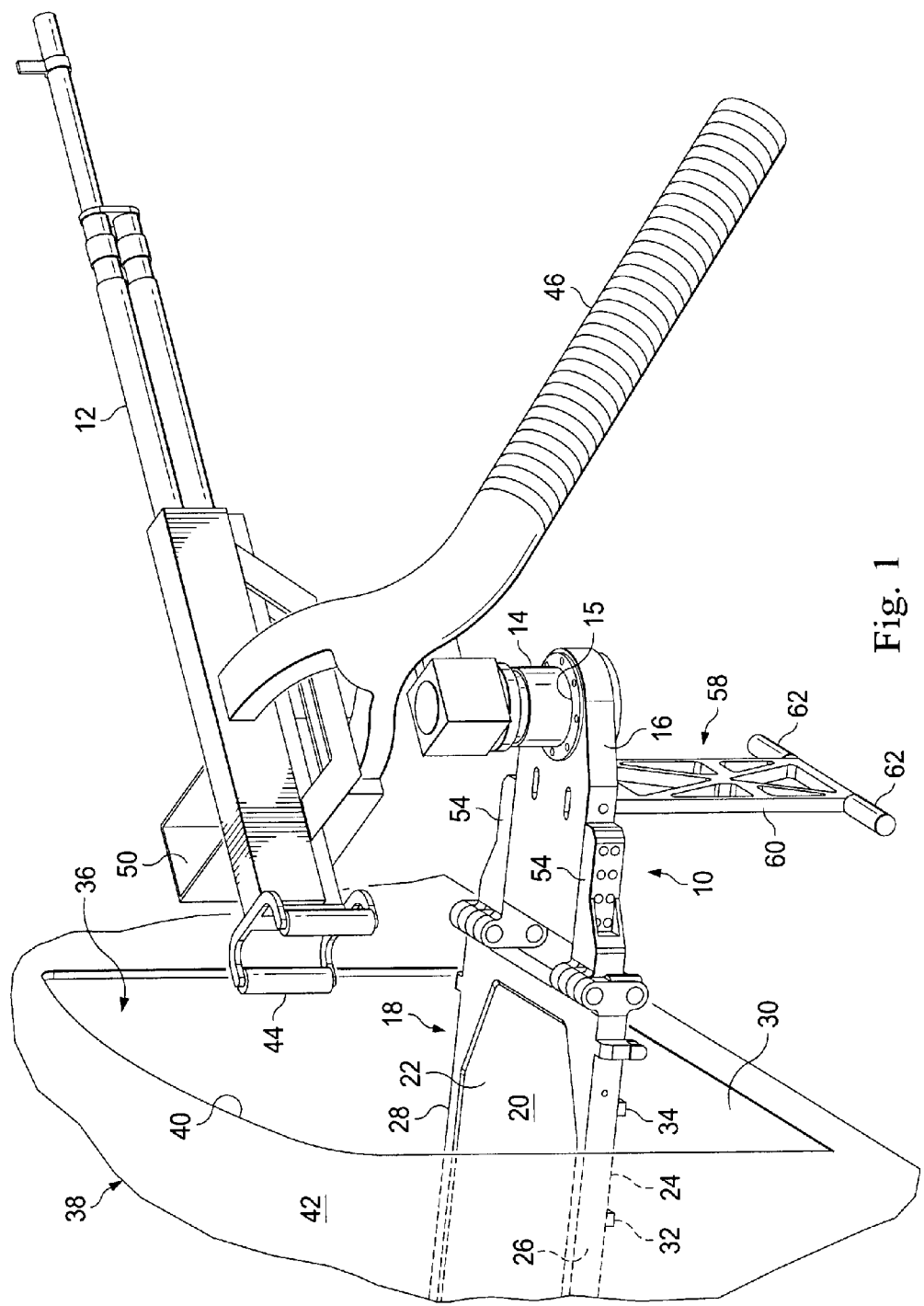
FIG. 1 is an inboard-directed perspective view of crew-served weapon mounting apparatus embodying principles of the present invention, the apparatus being mounted on a helicopter and operatively supporting a machine gun.
Figure 2:
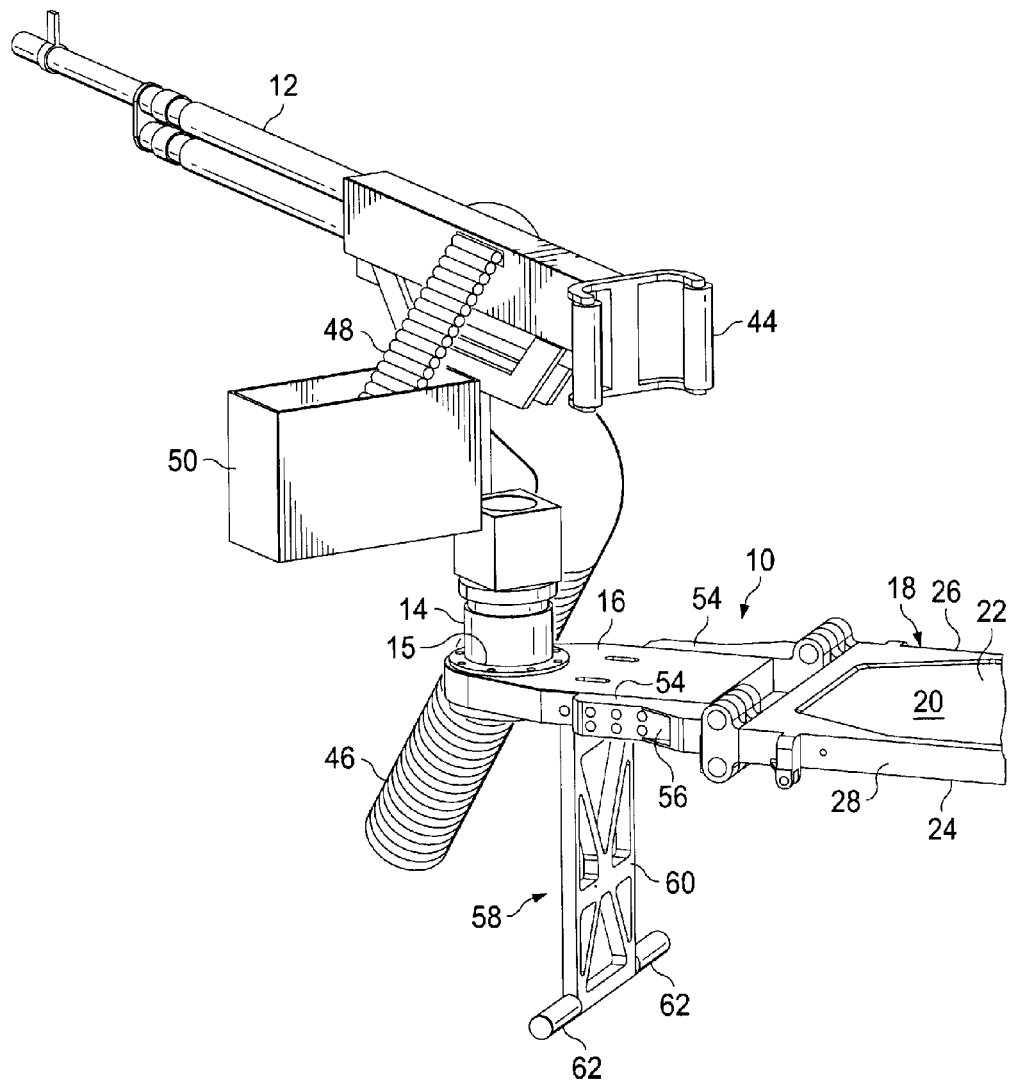
FIG. 2 is an outboard-directed perspective view of the crew-served weapon mounting apparatus of FIG. 1 removed from the helicopter.
Figure 3:
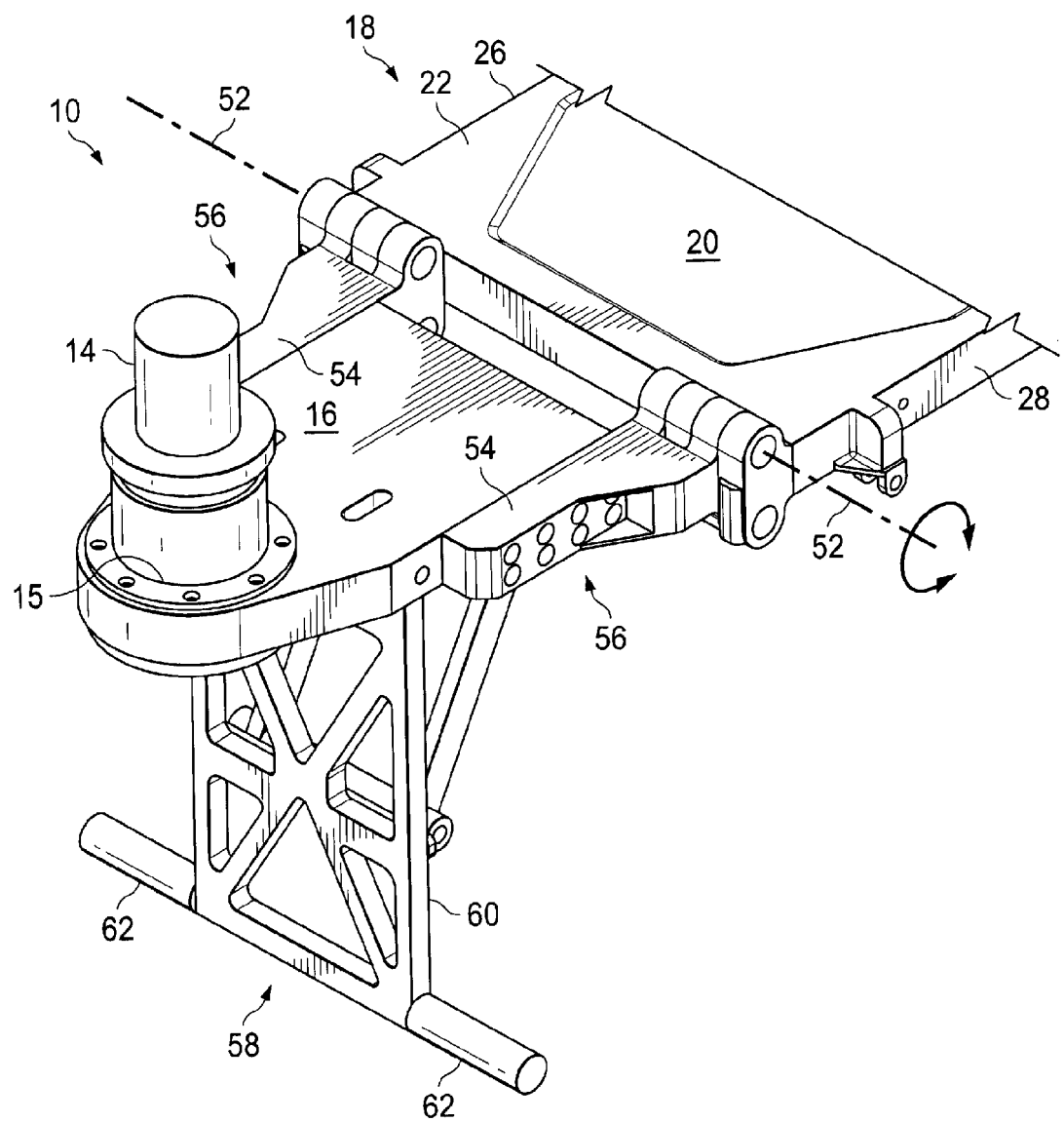
FIG. 3 is an enlarged scale inboard-directed perspective view of the FIG. 1 crew-served weapon mounting apparatus with the machine gun removed therefrom.

With reference to the accompanying FIGS. 1-3, this invention provides aircraft weapon mounting apparatus 10 that incorporates various improvements over the helicopter crew-served weapon mounting apparatus illustrated and described in U.S. Pat. No. 7,765,912 to Serkland, the subject matter of which is hereby incorporated herein by reference in its entirety. In the present invention, a crew-served weapon, representatively a machine gun 12, is pivotally and rotationally mounted via a pintle structure 14 on an outer end portion 16 of an elongated weaponry support beam 18 which may be similar in construction to the plank structure illustrated and described, for example, in U.S. Pat. No. 5,024,138 to Sanderson et al or U.S. Pat. No. 6,241,185 to Sanderson. The pintle structure 14 is preferably received in an opening 15 in the outboard end of the outer beam end portion 16 and, in a conventional manner, may be fitted with suitable adapter structures to permit other types of weaponry (for example, a different caliber machine gun) to be mounted on the pintle structure 14.

As illustrated in FIG. 1, the support beam 18 has a longitudinally intermediate section 20, and further has top and bottom sides 22 and 24 and opposite, laterally spaced apart side edges 26 and 28. The longitudinally intermediate beam portion 20 is suitably anchored, bottom side down as schematically shown at 32 and 34, to the floor 30 of a cabin or other interior area 36 of an aircraft, such as the illustrated helicopter 38, with the longitudinally intermediate beam portion 20 extending transversely through the cabin area 36 and outer beam end portion 16 projecting outwardly through an opening 40 in an exterior cabin wall 42. This places the machine gun 12 outboard of the wall 42. As shown in FIGS. 1 and 2, the machine gun 12 has an operator firing handle portion 44 and a spent casing discharge chute 46, and is supplied with belted ammunition 48 from an ammunition box 50 suitably supported on the machine gun 12. Preferably, the outer beam end portion 16 is removably and hingedly connected to the outer end or the longitudinally intermediate beam portion 20 for pivotal movement relative thereto about a horizontal axis 52 toward and away from the longitudinally intermediate beam portion 20 to permit the outer beam end portion 16 to be swung into the cabin area 36 onto the top of the longitudinally intermediate beam portion (in a manner similar to that shown in the aforementioned U.S. Pat. No. 6,241,185 to Sanderson).

As can be seen in FIGS. 1-3, in carrying out principles of the present invention in accordance with a representative embodiment thereof, the outer beam end portion 16 is provided with a unique configuration that substantially facilitates the use of the crew-served machine gun 12 (or another type of crew-served weapon mounted on the outer beam end portion 16). For example, along at least a substantial portion of its length, the outer beam end portion 16 is laterally narrower (i.e. between its opposite side edges) that the longitudinally intermediate beam portion 20. This facilitates the seating of a crew member (not shown) on an outer end portion of the support beam 18 with his legs disposed outwardly of the helicopter and downwardly straddling the outer beam end portion 16 while the crew member operatively grasps the machine gun firing handle portion 44.

The comfort and stability of this seated position of the crew member operating the machine gun 12 is illustratively enhanced by the securement to the outer side edges of the outer beam end portion, adjacent its juncture with the longitudinally intermediate beam portion 20, of generally L-shaped brackets 54 that form recesses 56 which receive portions of the gun operator's legs when they are downwardly straddling the outer beam end portion 16. As will be readily appreciated by those of skill in this particular art, the recesses 56 could be provided in a variety of other manners such as, for example, suitably forming them integrally with the outer beam end portion 16. Further stabilizing this seated weapon operator position is the provision of a specially designed foot rest structure 56 that depends from the underside of the outer beam end portion 16 between the pintle structure 14 and the inboard end of the outer beam end portion 16. The foot rest structure 58 has a vertically elongated body portion 60 from the bottom end of which opposed foot pegs 62 transversely project. With the gun operator's legs straddling the outer beam end portion and received in the bracket recesses 56, the operator simply braces his feet on the pegs 62.

The specially configured outer beam end portion 16 also facilitates a different gun operator position on the beam 18. Specifically, the operator may simply kneel down on the beam 20 facing the machine gun 12 in a position in which the operator may look directly downwardly past the opposite sides of the laterally narrowed outer beam end portion 16 to better survey downwardly disposed firing targets closer to the helicopter 38 or other type of aircraft on which the weapon mounting apparatus 10 is carried.

Figure 4:
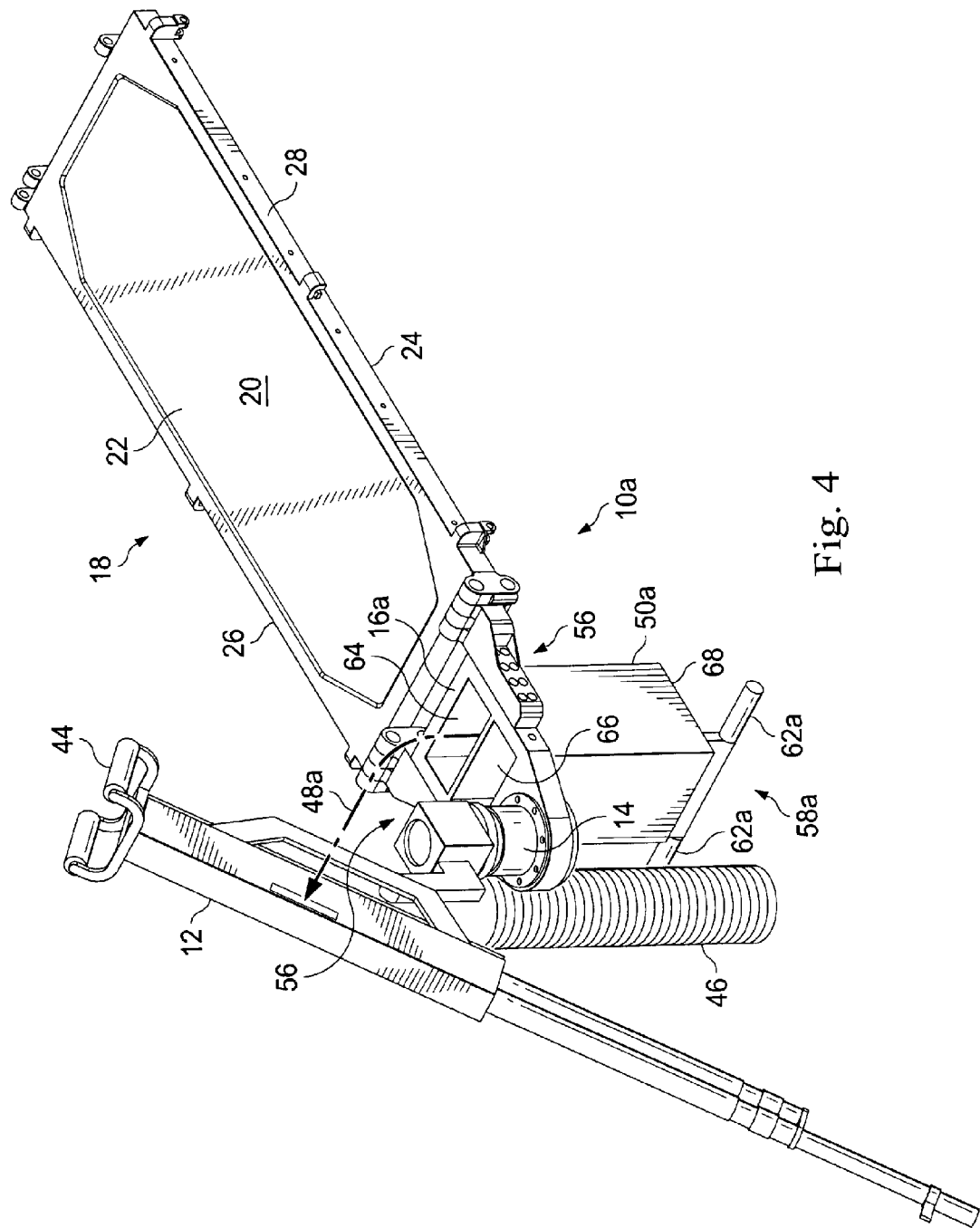
FIG. 4 is an enlarged scale inboard-directed perspective view of an alternate embodiment of the FIG. 1 crew-served weapon mounting apparatus with the machine gun removed therefrom.

Perspectively illustrated in FIG. 4 is an alternate embodiment 10a of the previously described aircraft weapon mounting apparatus 10. The aircraft weapon mounting apparatus 10a is identical to the previously described aircraft weapon mounting apparatus 10 (FIGS. 1-3) with the exception that in place of the gun-mounted ammunition box 50 illustratively utilized in the apparatus 10 vertically elongated rectangular ammunition box 50*a* which depends from a modified outer beam end portion 16*a* that has a rectangular opening 64 extending vertically therethrough inboard of the pintle structure 14 and generally between the recesses 56. The ammunition box 50*a* has an open top end 66 which underlies and is aligned with the opening 64, and a closed bottom end portion 68 from which opposite foot pegs 62*a* transversely extend.

Belted ammunition 48*a* is operatively fed to the machine gun 12 as schematically depicted by the dashed line in FIG. 4. The indicated outer plank end portion positioning of the ammunition box 50*a* conveniently permits access by the sitting gun operator to the ammunition box 50*a* due to the positioning of its upper feed end 66 between his legs. As can be seen, the ammunition box 50*a* and the foot pegs 62*a* shown in FIG. 4 form a foot rest structure 58*a* that replaces the previously described foot rest structure 58 shown in FIGS. 1-3, with the ammunition box 50*a* defining a support body portion of the foot rest structure 58*a*.

The foregoing detailed description is to be clearly understood as being given by way of illustration and example only, the spirit and scope of the present invention being limited solely by the appended claims.

What is claimed is:

1. For use on an aircraft having an interior area with an exterior side wall opening, armament apparatus comprising:
   an elongated, generally plank-shaped support beam member having top and bottom sides extending between opposite side edges, an outer end portion, and a longitudinally intermediate section extending inwardly from said outer end portion, said longitudinally intermediate section being sized and configured to be longitudinally extendable, bottom side down, transversely through the interior area and be secured within the interior area with said outer end portion extending outwardly through the exterior side wall opening, said outer end portion having, at least along a majority of its length, an edge-to-edge width less than that of said longitudinally intermediate section; and
   a weapon mounting structure, mounted on a top side portion of said outer end portion for operatively supporting a crew-served weapon,
   wherein the outer end portion is configured such that a crew member may sit on said support beam member, with the crew member's legs outside of the aircraft and downwardly straddling said outer end portion, and operate a crew-served weapon supported by said weapon mounting structure; and
   a foot rest structure depending from a bottom side of the outer end portion.

2. The armament apparatus of claim 1 wherein:
said outer end portion has opposite recesses formed in the opposite side edges thereof for receiving portions of the crew member's legs.

3. The armament apparatus of claim 1 wherein:
the aircraft is a helicopter.

4. The armament apparatus of claim 1 wherein:
said weapon mounting structure is operative to support a machine gun.

5. The armament apparatus of claim 1 wherein:
opposite side edges of said outer end portion have recesses therein, and
said foot rest structure is disposed between an outer end of said outer end portion and said opposite side edge recesses.

6. The armament apparatus of claim 1 wherein:
said foot rest structure includes a vertically extending support body having a lower end portion from which a pair of opposite foot pegs transversely extend.

7. The armament apparatus of claim 1 wherein:
said outer end portion is secured to said longitudinally intermediate section for pivotal movement about a horizontal axis toward and away from said longitudinally intermediate section.

8. The armament apparatus of claim 4 further comprising an ammunition box operatively carried on said outer end portion for use with a machine gun supported by said weapon mounting structure.

* * * * *